United States Patent
Moon (10) Patent No.: US 10,021,562 B2
(45) Date of Patent: Jul. 10, 2018

(54) MOBILE TRUSTED MODULE (MTM)-BASED SHORT MESSAGE SERVICE SECURITY SYSTEM AND METHOD THEREOF

(71) Applicant: ELECTRONICS AND TELECOMMUNICATIONS RESEARCH INSTITUTE, Daejeon (KR)

(72) Inventor: Hwa Shin Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 155 days.

(21) Appl. No.: 15/130,782

(22) Filed: Apr. 15, 2016

(65) Prior Publication Data
US 2016/0309331 A1    Oct. 20, 2016

(30) Foreign Application Priority Data
Apr. 16, 2015    (KR) .................. 10-2015-0053725

(51) Int. Cl.
*H04L 29/06*        (2006.01)
*H04W 12/04*       (2009.01)
(Continued)

(52) U.S. Cl.
CPC .......... *H04W 12/04* (2013.01); *H04W 4/005* (2013.01); *H04W 4/14* (2013.01); *H04W 4/70* (2018.02);
(Continued)

(58) Field of Classification Search
CPC .... G06F 21/57; G06F 21/6218; H04W 12/04; H04W 12/06; H04W 12/10; H04W 4/005;
(Continued)

(56) References Cited

U.S. PATENT DOCUMENTS 8,051,283 B2    11/2011    Lee et al.
8,442,231 B2    5/2013    MacChi
(Continued)

FOREIGN PATENT DOCUMENTS

KR        10-0848966 B1      7/2008
KR    10-2014-0058196 A      5/2014

OTHER PUBLICATIONS

He Rongyu et al., "A PK-SIM card based end-to end security framework for SMS", Computer Standards & Interfaces, 2009, pp. 629-641, vol. 31, Elsevier B.V..

*Primary Examiner* — Yogesh Paliwal (57) ABSTRACT

An MTM-based short message service security system and a method thereof are provided. A hardware security module according to the present invention includes an access control unit configured to verify the integrity of a SMS application and a request from the SMS application, and verify whether the SMS application has a permission for the request; a key management unit configured to store and manage a public key and a private key of the terminal, and an encryption key shared with a server configured to transmit a security message between the server and the terminal; and a security message processing unit configured to convert the security message based on a preset security policy when the security message is received from the server, and return the converted message to the SMS application.

8 Claims, 10 Drawing Sheets

(51) Int. Cl.
*H04W 4/14* (2009.01)
*H04W 4/70* (2018.01)
*H04W 12/08* (2009.01)
*H04W 4/00* (2018.01)
*H04W 12/02* (2009.01)
*H04W 12/12* (2009.01)

(52) U.S. Cl.
CPC ............ *H04W 12/08* (2013.01); *H04W 12/02* (2013.01); *H04W 12/12* (2013.01)

(58) Field of Classification Search
CPC ....... H04W 4/14; H04W 12/08; H04W 12/02; H04W 12/12; H04W 4/70; H04L 9/3234
USPC .......................................................... 713/161
See application file for complete search history.

(56) References Cited

U.S. PATENT DOCUMENTS

| | | | | |
|---|---|---|---|---|
| 2009/0265552 | A1* | 10/2009 | Moshir | H04L 63/0464 713/168 |
| 2009/0305673 | A1* | 12/2009 | Mardikar | H04L 51/38 455/411 |
| 2010/0159962 | A1* | 6/2010 | Cai | G06Q 20/20 455/466 |
| 2014/0031070 | A1* | 1/2014 | Nowack | H04L 29/06176 455/466 |
| 2014/0033318 | A1 | 1/2014 | Han et al. | |
| 2015/0113272 | A1* | 4/2015 | Han | G06F 21/00 713/168 |

* cited by examiner

MOBILE TRUSTED MODULE (MTM)-BASED SHORT MESSAGE SERVICE SECURITY SYSTEM AND METHOD THEREOF

CROSS-REFERENCE TO RELATED APPLICATION

This application claims priority to and the benefit of Korean Patent Application No. 10-2015-0053725, filed on Apr. 16, 2015, the disclosure of which is incorporated herein by reference in its entirety.

BACKGROUND

1. Field of the Invention

The present invention relates to a short message service security system using a H/W-based security module such as an MTM and a method thereof, and particularly, to an MTM-based short message service security system capable of preventing a received short message from being disclosed and detecting interception of the received short message by a malicious program, and a method thereof.

2. Discussion of Related Art

A Short Message Service (SMS), which is one of representative services provided via a communication network, is a service widely used worldwide. The SMS is a service in which a short message of 140 bytes or less (140 or 160 characters) is transmitted, and is widely used between individuals in addition to serving as a liaison between companies and customers due to advantages such as simplicity of the service with no restrictions on location. In particular, the SMS is widely used in the fields such as mobile payment, banking, and shopping, and also used as a method for user authentication.

In order to secure the SMS widely used in this manner, various inventions have been proposed for a long time. However, in the related art, research on security methods for the SMS has been conducted focusing on a process of transmitting messages between terminals or between a terminal and a server. That is, research has been conducted focusing on a method of preventing messages from being disclosed (intercepted or eavesdropped), changed, or lost by third-parties (attackers) in a message delivering process via a communication network, a sender or recipient identity checking method for preventing SMS spoofing, and the like.

In mobile phones used before the emergence of smartphones, only programs generated by mobile phone manufacturers could be installed on mobile phones. Accordingly, there was only one program for receiving short messages, and it was difficult to install malicious code on mobile phones. Therefore, there were no high security concerns for messages received in mobile phones.

However, smartphones, which have been recently widely used, have features, for example, various programs (APPs) can be installed on smartphones according to user preference, and resources such as text messages are shared and used by several programs (APPs) rather than being used only by one program. Due to such features, many malicious codes have already been actually distributed through smartphones. Among these, a significant amount of malicious codes access short messages. As an example, in Android-based smartphones, malicious code, which intercepts text messages for transmitting an authentication number and transmits the intercepted messages to the outside, have been distributed, which results in financial loss of users. That is, in such smartphone environments, safety of text messages received in terminals is not guaranteed anymore. Therefore, a method of protecting short messages safely inside the terminal is necessary.

SUMMARY OF THE INVENTION

In view of the above-described problems, the present invention provides an MTM-based short message service security system and a method thereof through which a recipient side as well as a sender can define a text message whose security is requested, this text message to request the security can be encrypted, and the encrypted text message can be checked only in a specific application program.

According to an aspect of the present invention, there is provided an MTM-based short message service security system that includes a user terminal including a hardware security module configured to encrypt or decrypt a short message in cooperation with a SMS application that is executed in an application processor and transmits and receives the short message and a server that uses the encryption keys shared with each hardware security module in user terminal, generates a security message through encrypting the received short message from a transmitting terminal with the encryption key shared with a target terminal, and transmits the security message to the target terminal.

The hardware security module may convert the security message received from the server based on a security policy set in the SMS application and return the converted security message to the SMS application.

The hardware security module may use the encryption key, decrypt the security message, and return the decrypted security message to the SMS application.

The hardware security module may use the encryption key, decrypt the security message, re-encrypt the decrypted security message using a separate key, and return the re-encrypted security message and a key ID of the separate key to the SMS application.

When the request for the security message is received from the SMS application, the hardware security module may generate a security message through encrypting the received short message with the encryption key, and return the message to the SMS application.

The server may convert the short message received from the transmitting terminal into the normal message or security message for target terminal based on a security policy set through the SMS application, and transmit the message generated as a result to the target terminal.

According to another aspect of the present invention, there is provided a hardware security module that provides the security functions for a short message in cooperation with a SMS application that is run in an application processor of a terminal. The module includes an access control unit configured to verify integrity of an application and a request from the application, and verify whether the application has a permission for the request; a key management unit configured to store and manage a public key and a private key of the terminal, and an encryption key shared with a server configured to transmit a short message to the terminal; and a security message processing unit configured to convert the received security message based on a preset security policy when the security message is received from the server, and return the converted message to the SMS application.

The security message processing unit may use the encryption key, decrypt the security message, and return the decrypted security message to the SMS application.

The security message processing unit may use the encryption key, decrypt the security message, re-encrypt the decrypted security message using a separate key, and return the re-encrypted security message and a key ID of the separate key to the SMS application.

When the request to generate the security message about a short message is received from the SMS application, the security message processing unit may use the encryption key, generate a security message through encrypting the short message, and return the message to the SMS application.

According to still another aspect of the present invention, there is provided a server that manages the encryption keys shared with each user terminal, generates a security message for the received message based on the security policy of target user, and transmits the security message to the target terminal. The server includes a security policy management unit configured to store and manage a security policy set by the target terminal; a security SMS message acknowledgement unit configured to verify whether a security message is transmitted to the SMS application on the target terminal; a key management unit configured to generate and manage the cryptographic keys used to encrypt or decrypt the messages for each target terminal; and a security SMS message generation unit configured to generate a security message through encrypting the message received from the transmitting terminal.

When the encrypted message is received from the transmitting terminal, the security SMS message generation unit may use the first encryption key shared between the server and the transmitting terminal to decrypt the encrypted message, and generate the security message in which the decrypted message is re-encrypted using the second encryption key shared between the server and the target terminal.

According to yet another aspect of the present invention, there is provided a short message service security method that is provided by a user terminal including a hardware security module configured to encrypt or decrypt a short message in cooperation with a SMS application that is executed in an application processor. The method includes receiving a security message encrypted with an encryption key shared with a server; converting the security message based on a preset security policy for managing the security message; and transmitting a reception checking message to the server on the reception of the security message.

The converting may include decrypting the security message using the encryption key and displaying the decrypted security message.

The converting may include decrypting the security message using the encryption key, re-encrypting the decrypted security message using a separate key, and storing the re-encrypted security message and a key ID of the separate key.

The short message service security method may further include, when a security message writing request is received from the SMS application, generating a security message in which the short message is encrypted using the encryption key, and returning the message to the SMS application.

According to yet another aspect of the present invention, there is provided a short message service security method that is provided by a server that manages the encryption keys shared with each target terminal, generates the security message based on the security policy of target terminal, and transmits the security message to the target terminal. The method includes generating the security message about the received normal message through encrypting the received normal message with the encryption key shared between the server and the target terminal if the security policy of target user regards the received message as the security message; delivering the security message to the target terminal and requesting a security message reception checking task from the target terminal; and verifying reception of the security message.

The Verification of the security message reception may include: setting a time-out for reception verification of the security message; determining whether a reception checking message generated when the target terminal performs a security message reception checking procedure is delivered within the time-out; and generating a reception checking error message when the reception checking message is not delivered within the time-out.

The reception checking message may include a hash value of plain text of the received security message or plain texts of most recently received N security messages, and The Verification of the security message reception may further include: checking whether a hash value of plain text of the transmitted security message or plain texts of recently transmitted N security messages matches a hash value included in the reception checking message when the reception checking message is delivered within the time-out; and generating a verification checking message when the values match, and generating an error message when the values do not match.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The above-described objects, other objects, advantages and features of the present invention, and methods of achieving the same will be clearly understood with reference to the accompanying drawings and the following detailed embodiments.

However, the present invention is not limited to the embodiments to be disclosed, but may be implemented in various different forms. The following embodiments are provided in order to fully explain the objects, configurations, and effects of the present invention for those skilled in the art. The scope of the present invention is defined by the appended claims.

Meanwhile, the terms used herein are provided to only describe embodiments of the present invention and not for purposes of limitation. Unless the context clearly indicates otherwise, the singular forms include the plural forms. It will be understood that the terms "comprises" and/or "comprising" used herein specify some stated components, steps, operations and/or elements, but do not preclude the presence or addition of one or more other components, steps, operations and/or elements.

Hereinafter, an MTM-based short message service security system and a method thereof according to the present invention will be described with reference to the accompanying drawings.

Figure 1:
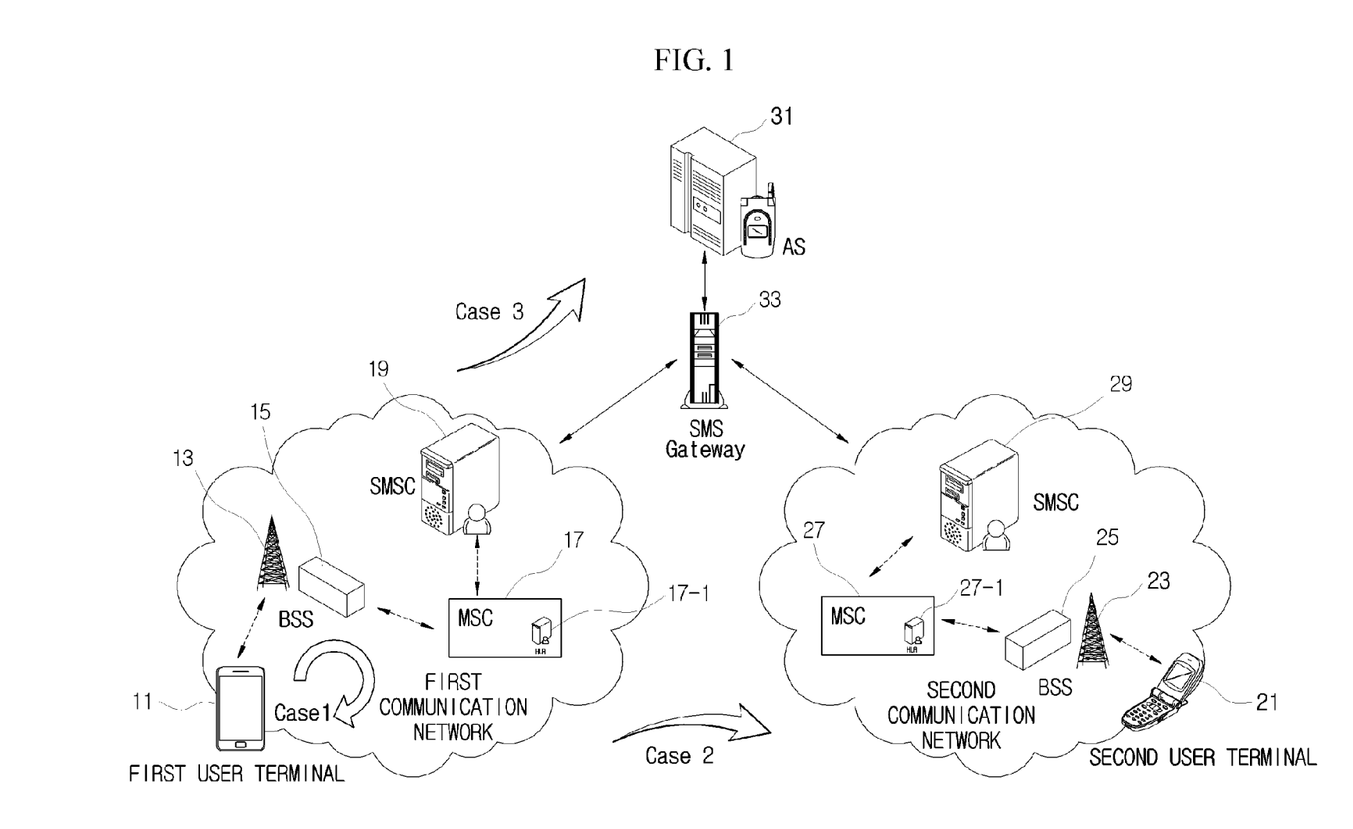
FIG. 1 illustrates how a short message is delivered in general mobile communication network.

FIG. 1 illustrates how a short message is delivered in general mobile communication network;

As illustrated in FIG. 1, in a mobile communication network mobile terminals 11 and 21 can be connected to the network through Base Transceiver Stations (BTSs) 13 and 23. Each group of these BTSs 13 and 23 is controlled by a related Base Station System(BSS) 15 and 25 according to geographical location, and the BSSs 15 and 25 are connected to Mobile Switching Centers (MSCs) 17 and 27.

The MSCs 17 and 27 are connected to MSCs of its own or other companies and other networks such as wired communication and PSTN, and perform various tasks including a call process such as routing and mobility management. In this case, as illustrated in FIG. 1, communication with other networks or other mobile networks is performed through a gateway 33.

The MSC 17 and 27 is associated with Home Location Register (HLR) servers. The HLR 17-1 and 27-1 manages various mobile subscriber information including an IMSI, an MSISDN (telephone number), important information included in a SIM card issued by communication operators, service information requested from a subscriber, a current location of a subscriber, and so on.

This mobile communication network provides users with a messaging service such as SMS which enables to exchange a short message (hereinafter, SMS message) between users. This messaging service is managed by a Short Message Service Center (SMSC). In the mobile communication network, a SMS message generated from the mobile terminal 11 is delivered to a home SMSC 19 of a sender through the BTS 13, the BSS 15, and the MSC 17. The SMSC 19 is a server to manage an SMS service, and may be connected to the MSC through an SMS gateway according to an installation location, but is described as being directly connected to the MSC in FIG. 1 for convenience of description.

When a SMSC 19 and 29 receives a SMSC message, the SMSC 19 and 29 checks the location of target terminal from the HLR 17-1 and 27-1 and delivers the message. Assume that the case that the target terminal belongs to the same mobile communication operator as a sender like a case 1 in FIG. 1. In particular, for simplicity if the home SMSC of target terminal is the same as the SMSC of sender, the SMSC 19 transmits the SMS message to the target terminal through the MSC 17, the BSS 15, and the BTS 13 related to the location of target terminal. For reference, when SMSC cannot transfer the received SMS message to the target terminal due to the power off of the target terminal, the SMSC 19 internally stores the received message and then transmits the message when the SMSC receives the information indicating that the terminal is accessible from the MSC 17 later.

When the target terminal of the message received by the SMSC 19 belongs to a different mobile communication operator as in a case 2 in FIG. 1, the SMSC 19 transmits a text message to the home SMSC 29 (SMSC that manages the target terminal) of the target terminal through the SMS gateway 33. The home SMSC 29 of the target terminal checks a location of the target terminal from the HLR 27-1, and then transmits the message to the target terminal through the MSC 27, the BSS 25, and the BTS 23 of the mobile communication network.

Meanwhile, a current SMS service supports to exchange the messages between mobile terminals and devices connected to the Internet. In particular, as a case 3 in FIG. 1, a SMS message can be exchanged between individuals and between an application server (AS) to provide an SMS service and an individual. When a SMS message received by the SMSCs 19 and 29 is a message that is delivered to a specific AS 31 connected to the Internet as in the case 3 in FIG. 1, the SMSCs 19 and 29 also transmit the SMS message to the AS 31 through the SMS gateway 33.

Figure 2:
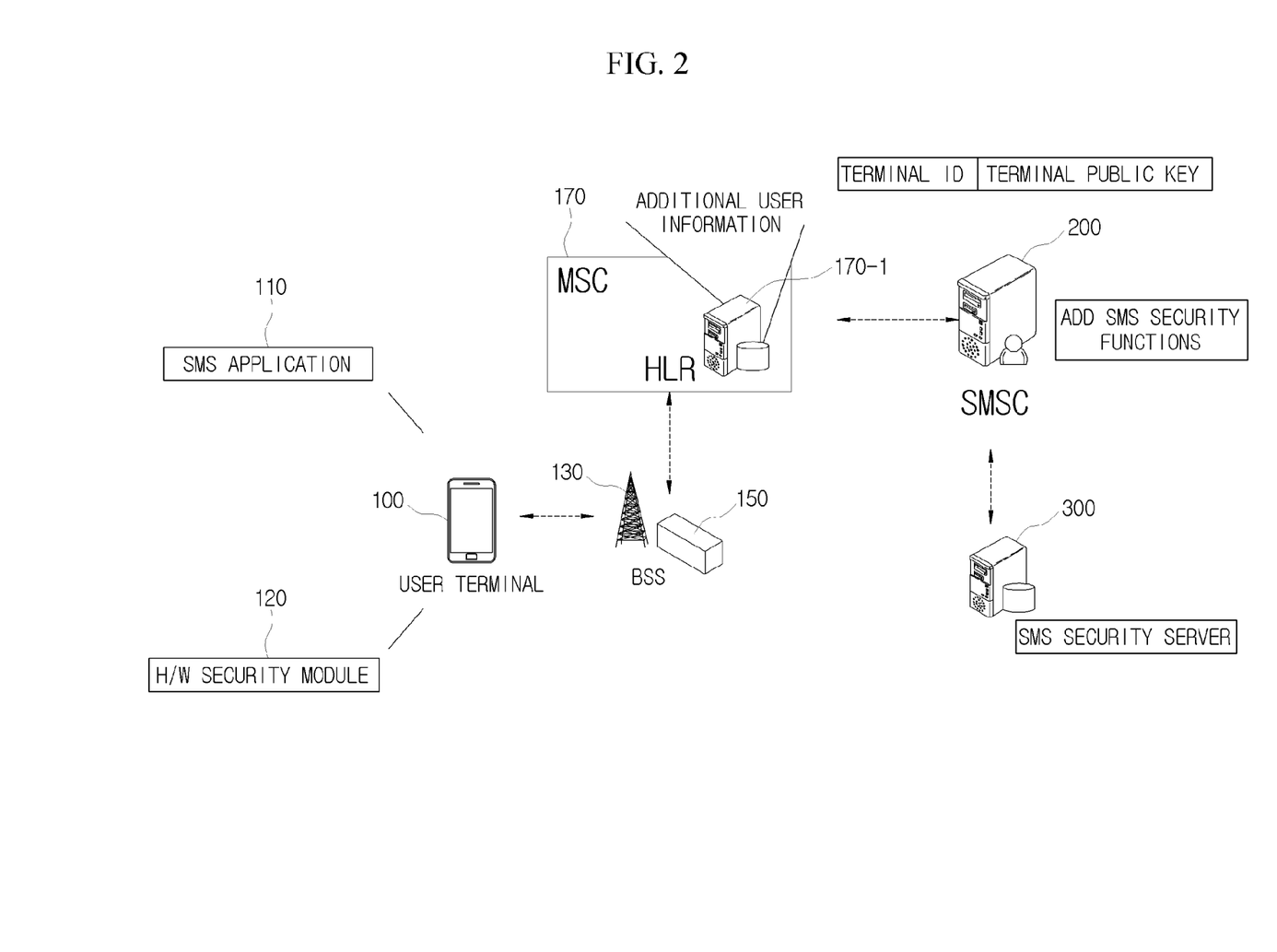
FIG. 2 is a diagram for describing an MTM-based short message service security system according to an embodiment of the present invention.

FIG. 2 is a diagram for describing an MTM-based short message service security system according to an embodiment of the present invention.

As illustrated in FIG. 2, to provide the more secure SMS service, the MTM-based short message service security system according to the embodiment of the present invention, adds new components or functions in the existing general mobile communication system as illustrated in FIG. 1. New components or functions will be described as a terminal side and a server side.

For example, in the terminal side, a short message security function is added to a short message application (hereinafter referred to as a "SMS application") executed in an application processor, and a hardware security module that is executed by a processor separate from the application processor is added.

In the server side, a SMS security server to provide short message security functions (hereinafter, SMS security functions) is added. For reference, the SMS security functions can be not only implemented on the SMS security server separate from the SMSC to manage the SMS service, but also added on the existing SMSC. Although for convenience of description FIG. 2 illustrates a case in which a SMS security server separate from the SMSC provides the SMS security functions, this is only an example, and the scope of the present invention is not limited thereto.

The SMS application provides users with new SMS security functions through the cooperation with the hardware security module on the terminal and the SMS security server. In order to provide new SMS security functions according to the embodiment of the present invention, a process at the server side will be described below with reference to FIG. 5A and FIG. 5B, and a process at the terminal side will be described below with reference to FIG. 6A and FIG. 6B.

The MTM-based short message service security system according to the present invention may include user terminals 100, BTSs 130, BSSs 150, MSCs 170, HLRs 170-1, an SMSCs 200, and a SMS security servers 300.

The user terminal 100 includes a SMS application 110 executed in the application processor and a hardware security module 120 executed in a separate processor.

The SMS application 110 provides a user interface for writing a SMS message, displays the written short message, and supports transmission of the message. Also, the SMS application 110 receives a SMS message transmitted from another user terminal, and displays the message.

Also, the SMS application 110 encrypts an important message through the hardware security module 120 or receives an encrypted security message, decrypts the message through the hardware security module, and displays the message to the user.

As described above, in the present invention, in order to protect an important message, the important message is encrypted. Encryption of the message is performed between the SMSC and a terminal (such as a mobile terminal, an AS, and other message transmitting and target terminals). In this case, a key to be used is managed in the hardware security module 120 and the SMS security server 300.

Meanwhile, in order to share a key among devices, methods disclosed in various inventions for key distribution in the related art may be used. For example, the hardware security module 120 may have terminal-specific asymmetric keys (a public key and a private key) generated during manufacture and a public key of a communication network.

Also, when a user subscribes to a communication service, a communication network operator may obtain public key information of the asymmetric key in the hardware security module 120 of the user terminal 100, and store and manage the information in the HLR 170-1. That is, the HLR 170-1 may manage a unique public key of the module for each terminal of users, and accurately, for each hardware security module of terminals.

Meanwhile, according to the embodiment of the present invention, a symmetric key (hereinafter referred to as an "encryption key") used to encrypt or decrypt a SMS message for a predetermined period may be generated in the SMS security server 300. Also, the encryption key is encrypted with a public key of the specific hardware security module 120 managed in the HLR 170-1, and transmitted to the user terminal 100 in the form of a message.

The user terminal 100 that has received the message transmits the message to the hardware security module 120 and requests a process. The hardware security module 120 decrypts the message with its own private key stored therein, verifies the message, and obtains a symmetric key used to encrypt or decrypt the SMS message during a period of validity.

Meanwhile, according to another embodiment of the present invention, a symmetric key (hereinafter referred to as an "encryption key") used to encrypt or decrypt the SMS message for a predetermined period may be generated in the hardware security module 120. Also, the encryption key may be encrypted with a public key of a communication network managed in the hardware security module 120 and transmitted to the SMS security server 300 in the form of a message for sharing. The above description for obtaining the encryption key used to encrypt and/or decrypt the short message is only an embodiment, and the scope of the present invention is not limited thereto.

The hardware security module 120 is configured as separate hardware such as a Universal Subscriber Identity Module (USIM) or a Mobile Trusted Module (MTM), and performs a security function.

Figure 3:
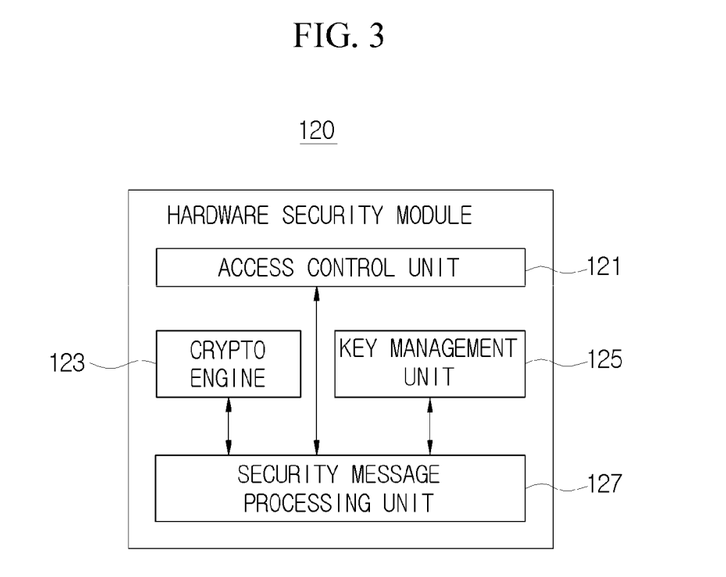
FIG. 3 is a diagram illustrating a block configuration of a hardware security module.

As illustrated in FIG. 3, the hardware security module 120 may include an access control unit 121, a crypto engine 123, a key management unit 125, and a security message processing unit 127.

The access control unit 121 examines validity a request from an application such as the SMS application 110 to the hardware security module 120, and determines whether the application has a permission to perform the request.

The crypto engine 123 provides various basic functions necessary for security, for example, various encryption algorithms such as RSA, AES, and DES and message digest algorithms.

The key management unit 125 generates and manages a hardware security module-specific asymmetric key, a public key of the communication operator, and a key to be used in each application.

The security message processing unit 127 manages a security policy of a user for message security, manages keys, and performs a security message processing request that is received from the SMS application in order to transmit and receive a security message and check security message reception. The message processing request is performed using the crypto engine 123 and the key management unit 125, and message processing will be described with reference to FIGS. 6 and 7.

As an example of a security policy managed in the security message processing unit 127, there are a received security message classification policy, a security message management policy, a message reception checking range and the like. The received security message classification policy is a policy for setting an important message that a user wants to protect, and may include a specific sender and a keyword (or keyword regular expression). That is, a recipient may define text delivered from a specific sender or text including a specific keyword such as authentication or transfer through the settings and the configuration of the present invention as a security message and protect the text. The security message management policy refers to user preferences for whether to store the received security message in an encrypted state or as plain text, or a rule of text stored in an encrypted state. Finally, the message reception checking range defines a range of a message on which reception checking is performed, and may have values such as a security message, a security message protected by recipient settings, or may be entirely unidentified.

As described above, the security policy managed by the security message processing unit 127 is received from and managed by a user through the SMS application. Among these, the received security message classification policy and the message reception checking range policy are delivered to the SMS security server (for reference, the security message refers to all messages that are encrypted and delivered to the SMS application, and the security message protected by the recipient settings refers to a message that is delivered in an encrypted state since it matches an important message setting policy of the recipient regardless of encryption of the sender).

Also, the security message processing unit 127 performs a task necessary for key management. In the above exemplified key management, when an encryption key sharing message is received from the SMS security server 300, the SMS application 110 delivers the message to the security message processing unit 127 of the hardware security module 120. The security message processing unit 127 decrypts or verifies the message using a crypto engine and a private key of a hardware security module stored in the key management unit 125, and when the message is valid, stores a key extracted from the received message in the key management unit 125.

Also, in the above exemplified second embodiment of key management, when generation of a session key to be shared is requested from the SMS application 110, the security message processing unit 127 of the hardware security module 120 generates a session key through the key management unit 125, encrypts the key with a public key of a communication operator through the crypto engine 123, and returns the encrypted key.

Also, the security message processing unit 127 instructs the key management unit 125 to perform tasks such as adding, changing, or deleting a key according to a request such as updating a key, expiration of a valid key period, or deleting a key.

Figure 4:
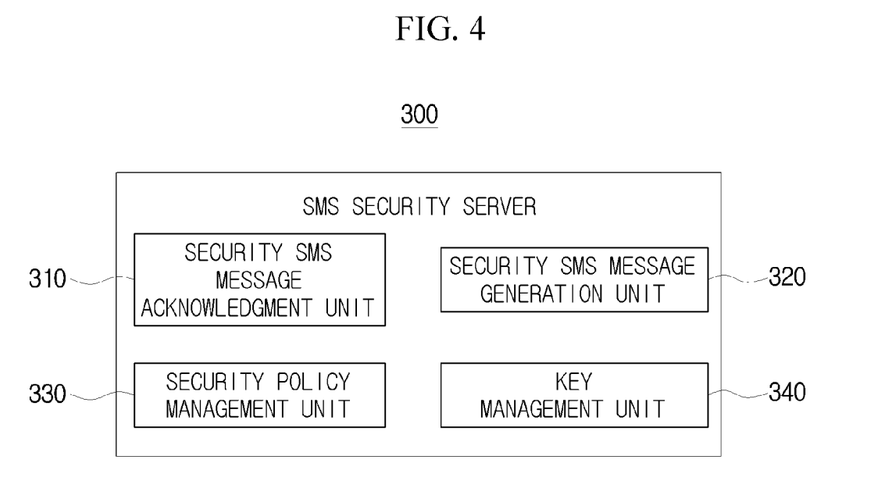
FIG. 4 is a diagram illustrating a block configuration of a SMS security server.

FIG. 4 is a diagram illustrating a block configuration of a SMS security server of FIG. 2.

As illustrated in FIG. 4, the SMS security server 300 may include a security SMS message acknowledgement unit 310, a security SMS message generation unit 320, a security policy management unit 330, and a key management unit 340.

The security SMS message acknowledgement unit 310 checks whether the security message is delivered to the SMS application, and detailed operations thereof will be described below with reference to FIG. 7A and FIG. 7B.

The security SMS message generation unit 320 encrypts or decrypts a message according to a security policy of the received message and the recipient and generates the security message, and detailed operations thereof will be described with reference to FIG. 5A and FIG. 5B.

The security policy management unit 330 receives the security policy set by the user from the SMS application 110 and manages the policy.

The key management unit 340 generates and shares a key used to encrypt or decrypt a message for each terminal and manages the key. In this case, the terminal refers to a user terminal and another SMSC and AS (methods of the related art are used to share a key between the SMSC and the AS, and a method other than the above exemplified methods can be used to share a key with the user terminal).

Hereinafter, the SMS message service security method according to the present invention corresponding to operations of the MTM-based short message service security system according to the present invention described above will be described step by step with reference to FIGS. 5 to 7.

Figure 5A:
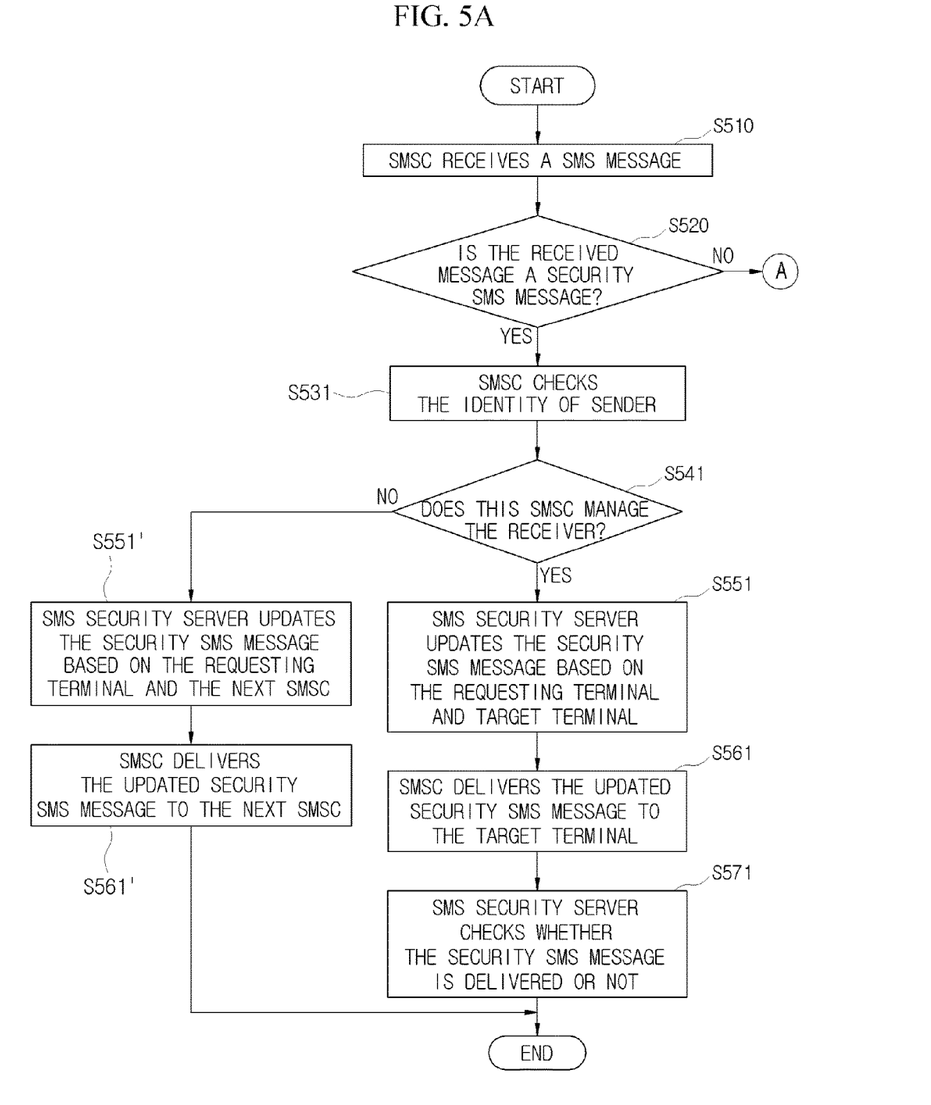
FIG. 5A and FIG. 5B describe how both a short message service center and a SMS security server processes a short message according to an embodiment of the present invention.
Figure 5B:
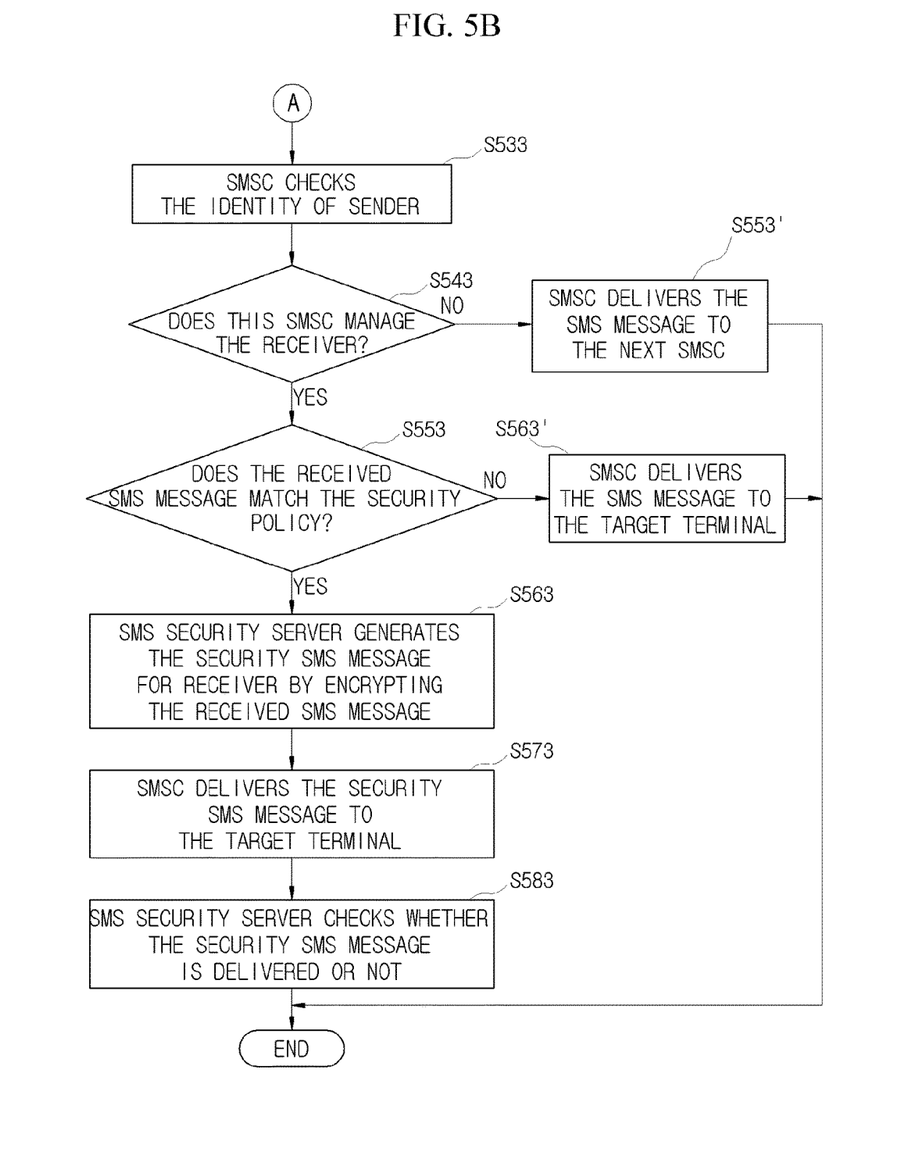

FIGS. 5A and 5B are diagrams for describing a process of processing the SMS message in the SMS message service center (SMSC) and a SMS security server of FIG. 2;

As illustrated in FIGS. 2 and 5, when the SMSC 200 receives the SMS message (S510), it is checked whether the received short message is a security SMS message encrypted in a transmitting terminal or a general message that is not encrypted (S520).

According to the configuration of the present invention, the transmitting terminal can also write and send an encrypted security message. As an example, when the sender requests writing of the security message, the SMS application may request generation of a security message for the message written by the user from the hardware security module. In this case, a security message processing unit of the hardware security module may use an encryption key managed in the key management unit, encrypt the received message, and generate the security message.

When the received message is the security message, the SMSC 200 checks the sender, and performs a procedure of authenticating the sender according to a security function installed in the SMSC 200 as necessary (S531).

Then, it is checked whether the recipient of the message is the user managed by the SMSC 200 (S541). When the SMSC 200 is a home SMSC of the recipient, the security message is updated through the security SMS message generation unit 320 of the SMS security server 300 (S551).

In this case, the security message update refers to a task in which the received message is decrypted and then encrypted again according to a delivery target.

In the above example, an encryption key managed between the transmitting terminal (when the sender or the AS is the user managed by the SMSC) and the SMSC 200 or an encryption key managed between another SMSC (when the sender is not the user managed by the SMSC) and the SMSC is used to decrypt the received message, and an encryption key managed between the target terminal and the SMSC 200 is used to encrypt again the decrypted message.

When the security message update is completed, the SMSC 200 performs a task of delivering the security message to the target terminal through the MSC (S561), and then requests performing a text reception checking task from the security SMS message acknowledgement unit 310 of the SMS security server 300 (S571).

On the other hand, when the recipient of the received security message is not the user managed by the SMSC 200, the security SMS message is updated through the security SMS message generation unit 320 of the SMS security server 300 (S551'), and the updated security message is delivered to the SMSC (reception SMSC) that manages the target terminal (S561').

In this case, in order to update the security message, the security SMS message generation unit 320 of the SMS security server 300 uses the encryption key between the transmitting terminal and the SMSC 200 to decrypt the security message, and then uses the encryption key between the SMSC 200 and the reception SMSC to encrypt the message.

On the other hand, when the message received by the SMSC 200 is the general message, the SMSC 200 also checks the sender and performs a procedure of authenticating the sender according to a security function installed in the SMSC 200 as necessary (S533).

When the recipient of the received general message is not the user managed by the SMSC 200, the text message is delivered to the SMSC (reception SMSC) that manages the recipient (S553').

On the other hand, when the recipient is a user managed by the SMSC 200, it is checked whether the received message matches the security policy of the recipient in cooperation with the SMS security server 300, that is, whether the message is transmitted from a preset sender or a preset keyword is included (S553).

When the received message does not match the security policy, the received message is transmitted to the terminal through the MSC (S563').

On the other hand, when the received message matches the security policy set by the recipient, the encryption key between the SMSC 200 and the target terminal is used to encrypt the text message through the security SMS message generation unit 320 of the SMS security server 300 and thus the security message is generated (S563).

Then, the SMSC 200 delivers the generated security message to the target terminal (S573), and requests a message reception checking task from the security SMS message acknowledgement unit 310 of the SMS security server 300 (S583).

Figure 6A:
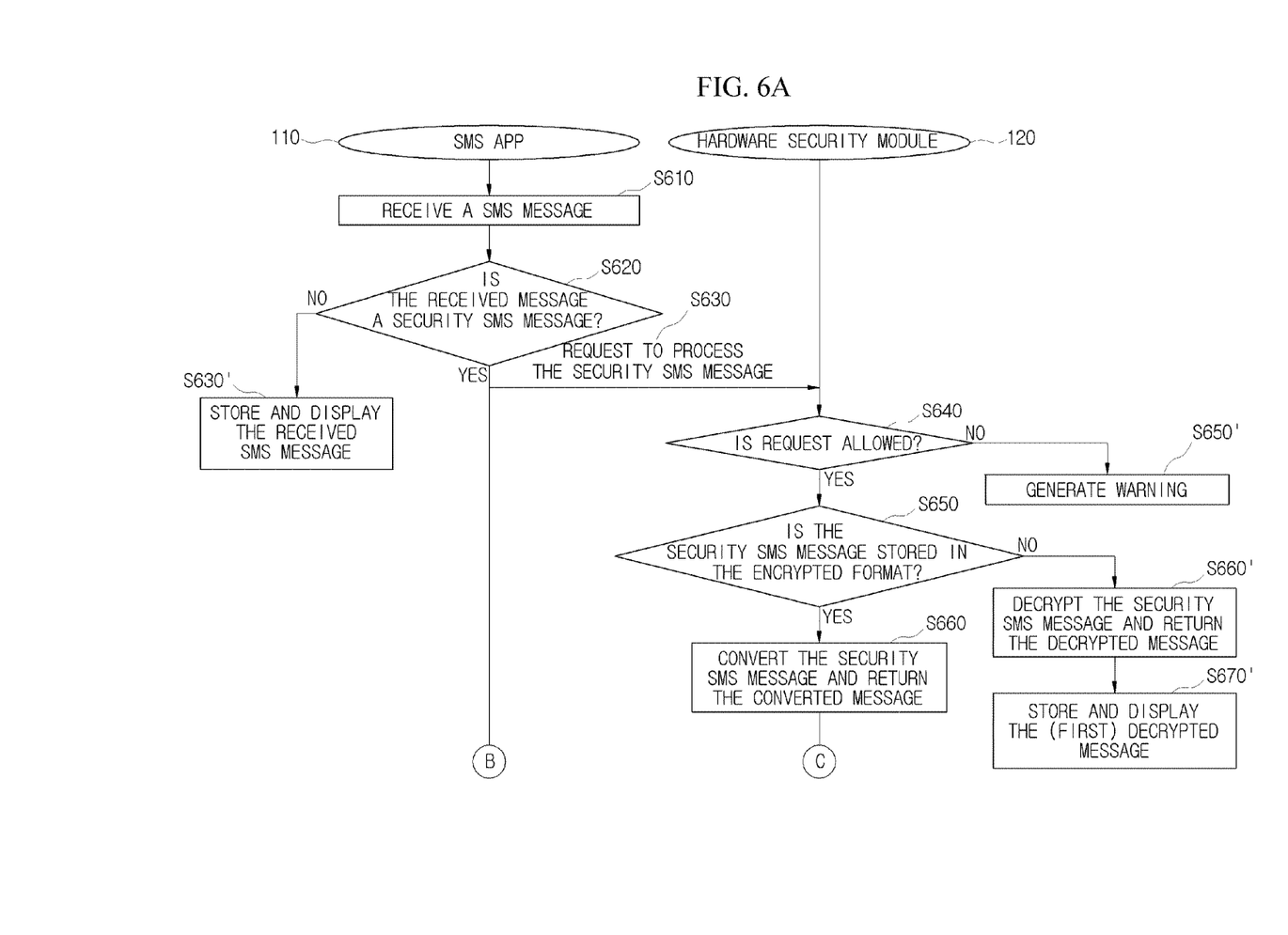
FIG. 6A and FIG. 6B describe how a short message is processed in a user terminal according to an embodiment of the present invention.
Figure 6B:
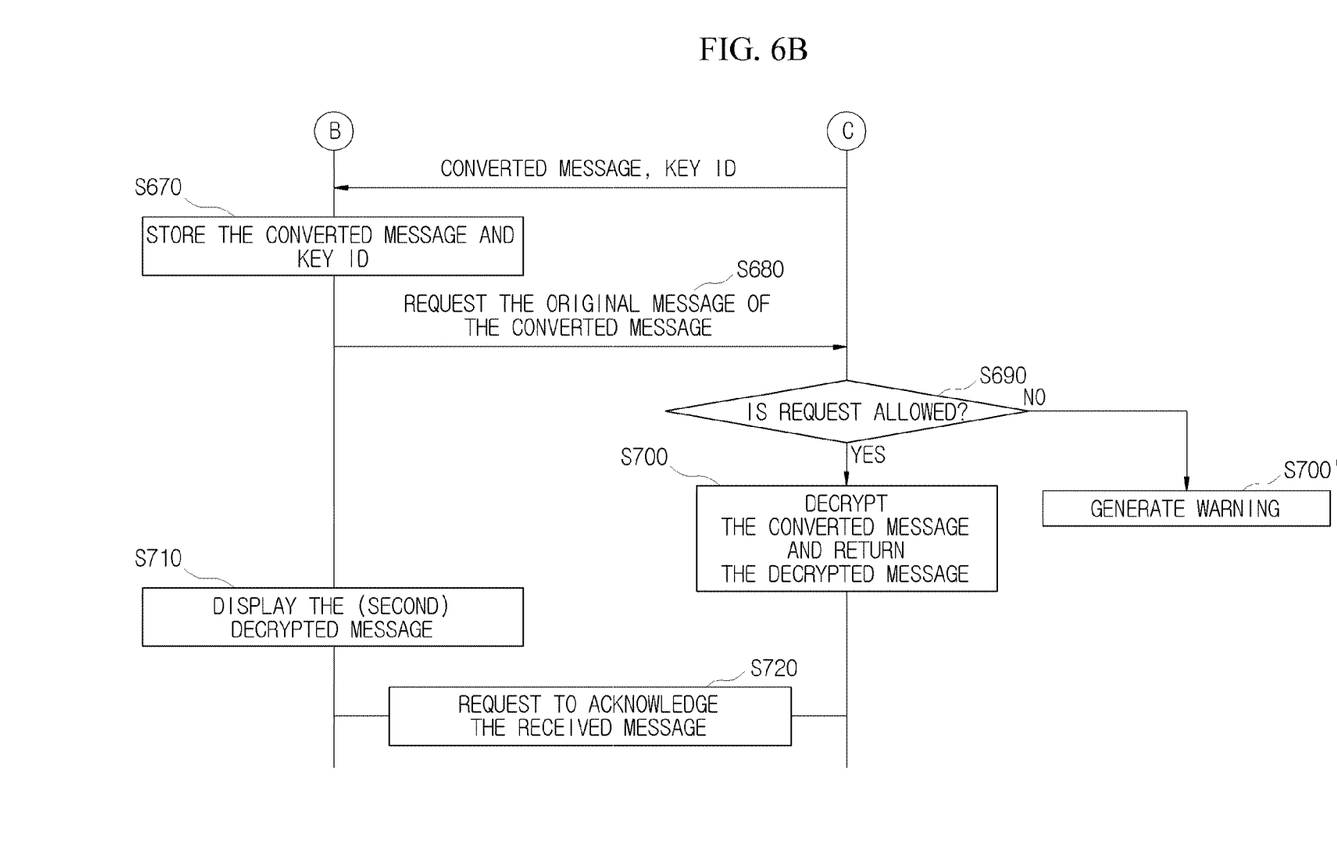

FIG. 6A and FIG. 6B are diagrams for describing a process of processing the SMS message in a user terminal of FIG. 2.

As described above with reference to FIG. 2, according to the embodiment of the present invention, in order to provide a security service from the user terminal, the SMS application 110 and the hardware security module 120 are interlinked to process the message. FIG. 6A and FIG. 6B illustrates tasks processed in each of the SMS application 110 and the hardware security module 120 and tasks processed therebetween.

As illustrated in FIG. 6A, when the SMS application 110 receives the SMS message (S610), it is determined whether this message is a general message or a security message (S620).

When the received message is the general message, the message is stored as above and shown for the user (S630').

On the other hand, when the received message is the security message, the SMS application 110 requests a process of processing the received message from the hardware security module 120 (S630).

In this case, the access control unit 121 of the hardware security module 120 verifies a request application and the received request, and determines request processing (S640). When situations such as damage of integrity of the SMS application or requesting, by an application other than the SMS application, the security message processing, the access control unit 121 rejects the request and generates an alarm for informing the user of the fact related thereto (S650').

On the other hand, when the access control unit 121 allows the request, the security message processing unit 127 checks whether the security message is encrypted and managed in the terminal or managed as plain text in the security policy set by the user (S650).

When the user sets the policy in which the security message is managed as plain text, the security message processing unit 127 uses the encryption key (a text encryption or decryption key between the SMSC and the terminal) managed in the key management unit 125 to decrypt the message, and returns the decrypted message to the SMS application 110 (S660').

The SMS application 110 also stores the message and then shows the message for the user (S670').

On the other hand, when the user sets the policy in which the security message is encrypted and managed, the security message processing unit 127 decrypts the short message, obtains an original message, uses a key that is generated to manage text in the SMS application to encrypt the message, and returns the encrypted message and an ID of the key that is used to encrypt the message (S660).

The SMS application 110 stores the returned encrypted message and key ID (S670).

Here, it should be noted that the key used to encrypt and store the short message is different from the encryption key that is shared between the SMSC and the terminal in order to encrypt or decrypt the short message.

The encryption key shared between the terminal and the SMSC is periodically changed in order to obtain stability of the key. In this manner, when the encryption key periodically changed in order to obtain stability of the key is directly used to store the short message in an encrypted state, it may be impossible to manage keys for all stored messages.

Therefore, the key used for storing the short message in an encrypted state in the terminal is different from the encryption key shared between the terminal and the SMSC.

Meanwhile, when the user requests checking of the content in short messages that are encrypted and managed in the terminal, the encrypted short message is decrypted through the hardware security module and shown for the user, and original content is not stored as plain text in the terminal.

In order to show the received short message, the SMS application 110 requests security message checking from the hardware security module 120 (S680).

The hardware security module 120 determines request processing by verifying the request application and the received request (S690).

When the request is rejected, the hardware security module 120 generates warning (S700'), and otherwise, when the access control unit 121 allows the request, a message encrypted with the key corresponding to the input key ID of the requesting application is decrypted and returned (S700).

The SMS application 110 shows the returned content for the user (S710), and starts a security message reception checking procedure (S720).

Figure 7A:
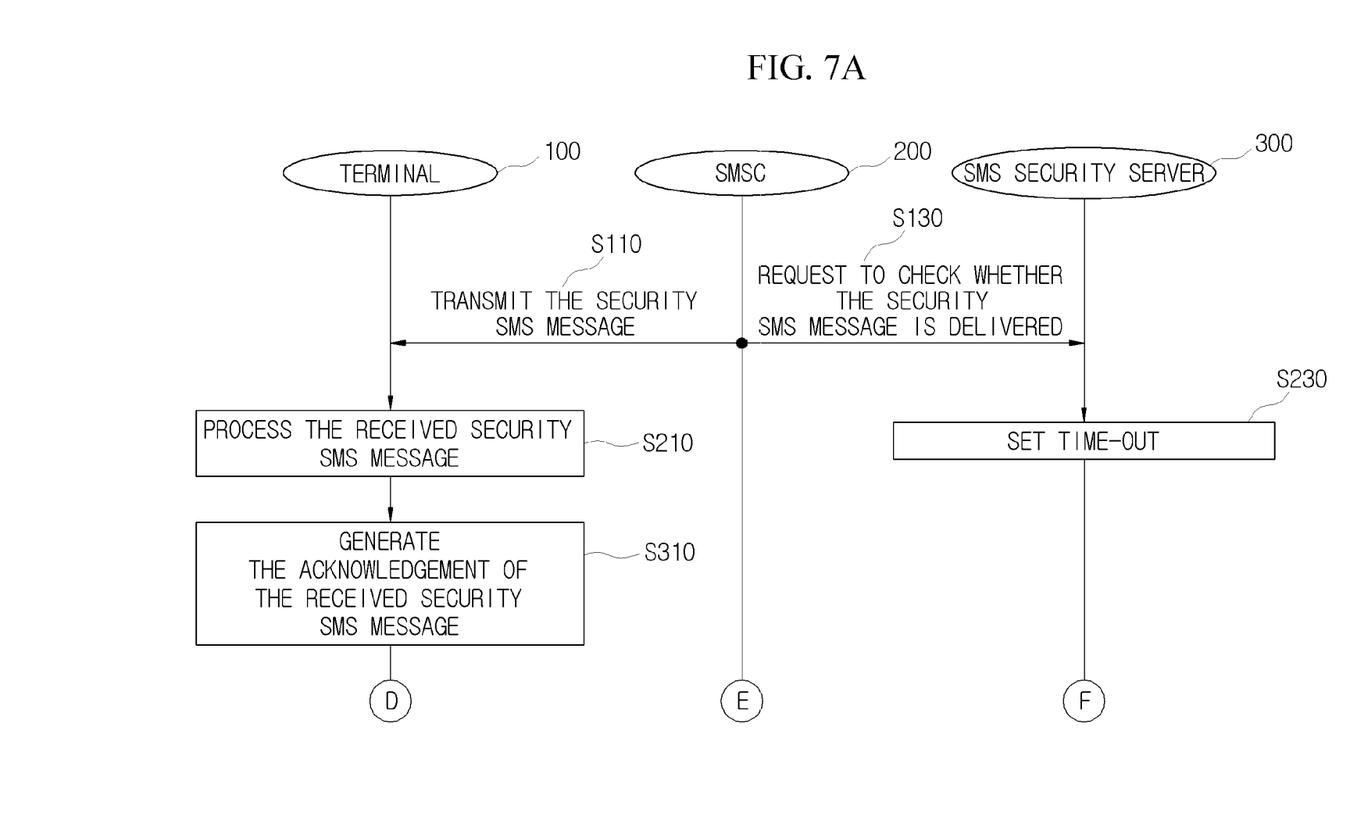
FIG. 7A and FIG. 7B describes the process to check whether any security short message is transferred to the SMS application or not.
Figure 7B:
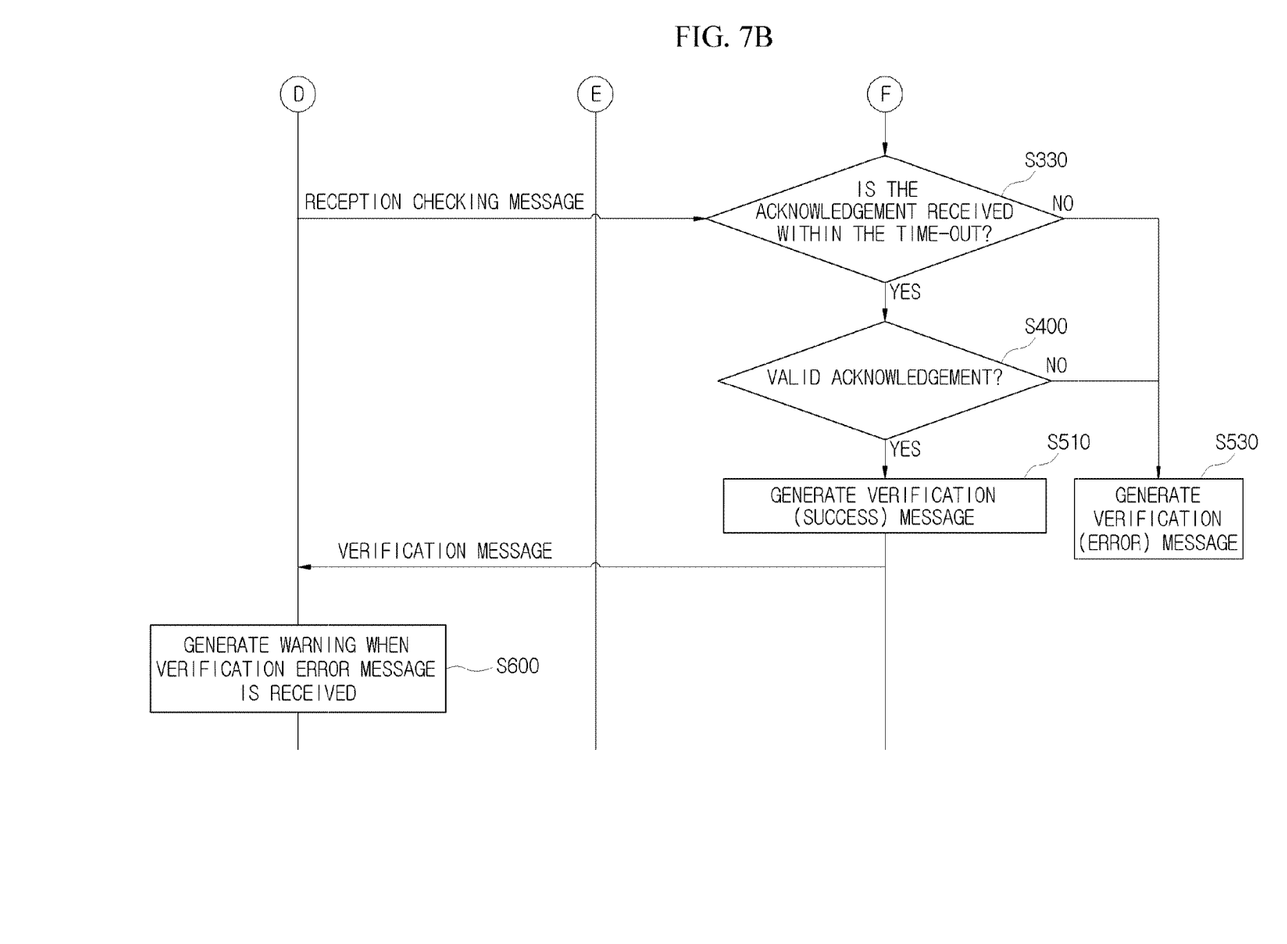

FIG. 7A and FIG. 7B are diagrams for describing a process of checking security message reception when a user terminal, the SMS message service center and a SMS security server of FIG. 2 are interlinked.

As illustrated in FIG. 7A, the SMSC delivers the security message to the target terminal 100 (S110), and requests security message reception checking from the SMS security server 300 simultaneously or sequentially (S130). In this case, security SMS message acknowledgement unit 310 of the SMS security server 300 determines whether message reception is checked according to a management policy stored in the security policy management unit 330. Checking whether the message is received is determined as a message reception checking range value managed in the security policy management unit 330.

In this case, when it is determined that reception checking of the requested message is unnecessary, the reception checking procedure ends. On the other hand, when it is determined that reception checking of the requested message is necessary, a time-out for verifying reception of the security message is set (S230).

Meanwhile, the target terminal 100 performs the security message reception checking procedure according to a predefined process. For example, when the SMS application 110 of the target terminal 100 receives the security message, the received message is processed by the method described in FIG. 6A and FIG. 6B, and then the security message reception checking procedure begins. In this case, the security message processing unit 127 of the hardware security module 120 checks the security policy and determines whether reception checking of the message is performed, and when the reception checking is necessary, generates a message for reception checking (S310). Since details thereof have been described above with reference to FIG. 6A and FIG. 6B, repeated descriptions will be omitted.

The security SMS message acknowledgement unit 310 determines whether a reception checking message is delivered from the target terminal 100 within a predetermined time (time-out) (S330). When no reception checking message is delivered within the predetermined time, no reception of the message is considered, and a reception checking error message is generated (S530).

Meanwhile, the reception checking message generated in operation S310 may include a hash value of plain text of the received security message or the received security message, and include hash values of plain texts of most recently received N security messages.

Therefore, the security message processing unit 127 manages the recent N security messages itself. The reception checking message generated through the security message processing unit 127 is transmitted to the SMS security server 300 through the SMS application 110.

When the reception checking message for the short message in a waiting state is received, the SMS security server 300 verifies the message (S400). Such verification may be performed by checking whether a hash value of plain text of the transmitted security message or plain texts of the recently transmitted N security messages matches a hash value included in the reception checking message.

When the values match, the SMS security server 300 generates a verification checking message (S510), and otherwise, generates an error message (S530).

The verification checking message generated in operation S510 or the error message generated in operation S530 is transmitted to the target terminal 100. When the error message is received, the SMS application 110 of the target terminal 100 notifies of the user by an alarm (S600).

According to the present invention, regardless of intention of the sender and providing a security function of the transmitting terminal, it is possible to protect received short messages safely. In particular, it is possible to prevent important information delivered through short messages from being disclosed by malicious code, and check whether an important message to be checked is intercepted by malicious code in real time. Accordingly, it is possible to decrease secondary damage caused when the important message is not checked.

While the embodiments of the MTM-based short message service security system and the method thereof according to the present invention have been described, the scope of the present invention is not limited to specific embodiments, and it is apparent to those skilled in the art that several alternatives, modifications, and changes without departing the scope of the present invention can be performed.

Therefore, the embodiments and the accompanying drawings of the present invention are considered in a descriptive sense only and not for purposes of limitation. The scope of the present invention is not limited by these embodiments and the accompanying drawings. It should be understood that the scope of the present invention is interpreted by the appended claims and encompasses all equivalent technological scopes.

REFERENCE NUMERALS

100: user terminal,
200: SMSC,
300: SMS security server
110: SMS application,
120: hardware security module
121: access control unit,
123: crypto engine
125: key management unit,
127: security message processing unit
310: security SMS message acknowledgement unit,
320: security SMS message generation unit
330: security policy management unit,
340: key management unit

What is claimed is:

1. A hardware security module of a terminal, comprising:
an access control unit configured to verify an integrity of a short message service (SMS) application and a request for processing a security message, and verify whether the SMS application has a permission for performing the request;
a key management unit configured to store and manage a public key and a private key of the terminal, and an encryption key shared with a server, the server being configured for transmitting the security message to the terminal; and
a security message processing unit configured to convert the security message based on a preset security policy for managing the security message when the security message is received from the server, and return the converted message to the SMS application,
wherein, when the security policy is set to manage the security message in an encrypted state, the security message processing unit decrypts the security message using the encryption key, re-encrypts the decrypted security message using a separate key, and returns the re-encrypted security message and a key ID of the separate key to the SMS application.

2. The hardware security module of claim 1,
wherein, when the security policy is set to manage the security message as a plain text, the security message processing unit decrypts the security message using the encryption key, and returns the decrypted security message to the SMS application.

3. The hardware security module of claim 1, wherein the security message is a first security message, and
wherein, when a request for generating a second security message is received from the SMS application, the security message processing unit generates the second security message by encrypting a short message received from the SMS application using the encryption key, and returns the second security message to the SMS application.

4. A short message service security method of a terminal that includes a hardware security module and an SMS application, the method comprising:
receiving, from a server, a security message that has been encrypted using an encryption key, the terminal sharing the encryption key with the server;
converting the security message based on a preset security policy for managing the security message; and
transmitting a reception checking message to the server when reception of the security message is completed,
wherein, when the security policy is set to manage the security message in an encrypted state, the converting includes:
decrypting the security message using the encryption key;
re-encrypting the decrypted security message using a separate key; and
storing the re-encrypted security message and a key ID of the separate key.

5. The short message service security method of claim 4,
wherein, when the security policy is set to manage the security message as a plain text, the converting includes
decrypting the security message using the encryption key and displaying the decrypted security message.

6. The short message service security method of claim 4, further comprising
when a security message generating request is received from the SMS application, generating, by the hardware security module, a security message by encrypting a short message using the encryption key, and returning, the hardware security module, the generated security message to the SMS application.

7. A short message service security method that is provided by a server, the method comprising:
generating a security message by encrypting a short message from a transmitting terminal using an encryption key when the short message matches a security policy that is set by a target terminal;
delivering the security message to the target terminal and requesting a security message reception checking task from the target terminal; and verifying reception of the security message based on a reception checking message received from the target terminal, the reception checking message being generated when the reception of the security message is completed by the target terminal, wherein the reception checking message includes a hash value of a plain text of the security message, or includes hash values of plain texts of N security messages including the security message that the target terminal has received most recently, and wherein the verifying of the reception includes:
checking whether a hash value of a plain text of the security message that the server has transmitted or hash values of plain texts of N security messages that the server has transmitted most recently to the target terminal match the hash value or the hash values included in the reception checking message, respectively; and generating a verification checking message when the hash values in the server match the hash values in the reception checking message, and generating an error message when the hash values do not match.

8. The short message service security method of claim 7, wherein the verifying of the reception further includes:
setting a predetermined time for the verification;
determining whether the reception checking message is received from the target terminal within the predetermined time; and
generating the verification checking message when the reception checking message is received within the predetermined time and the hash values match, and generating a reception checking error message when the reception checking message is not received within the predetermined time, based on the determination result.

* * * * *